July 2, 1940.   J. T. HELLMANN   2,206,352
CORD TAKE-UP
Filed Jan. 20, 1939   2 Sheets-Sheet 1
Fig. 1.
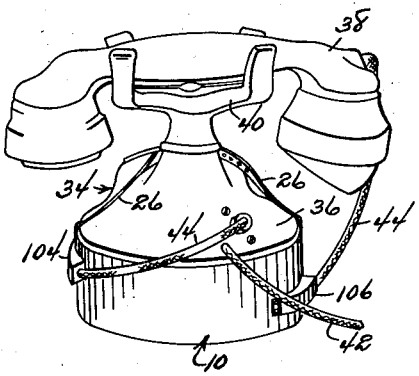
Fig. 10.
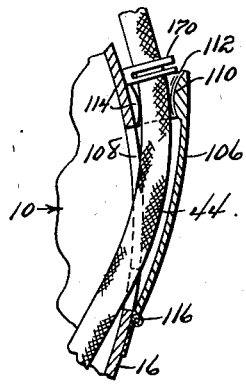
Fig. 2.
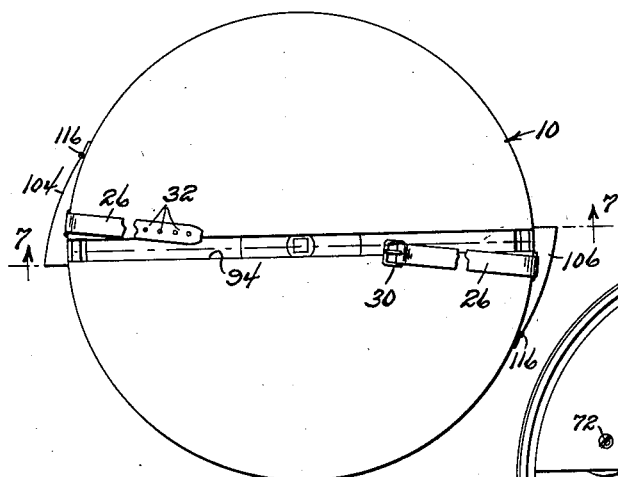
Fig. 3.
Fig. 4.
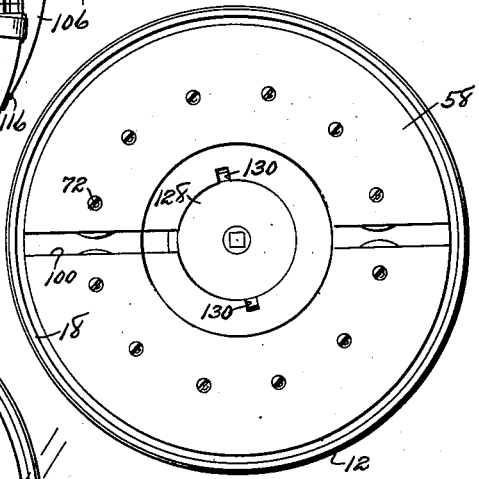
Jay T. Hellmann
INVENTOR
BY Victor J. Evans & Co.
ATTORNEYS July 2, 1940.  J. T. HELLMANN  2,206,352
CORD TAKE-UP
Filed Jan. 20, 1939  2 Sheets-Sheet 2
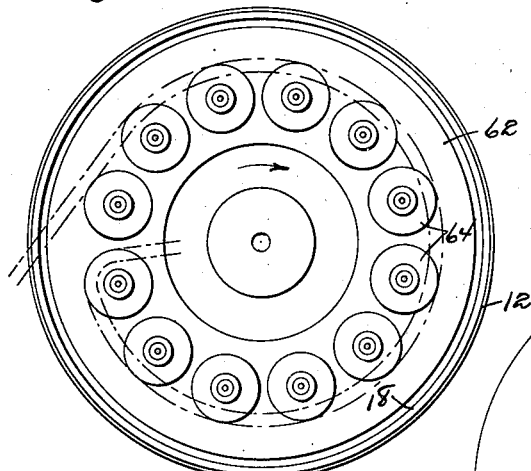
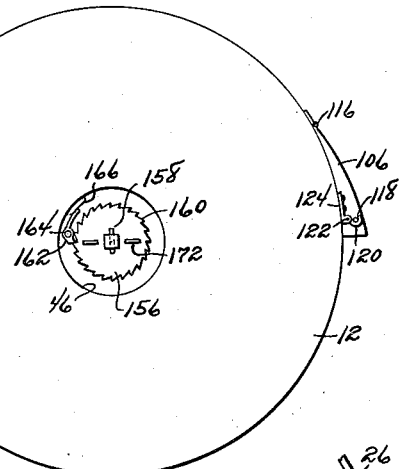
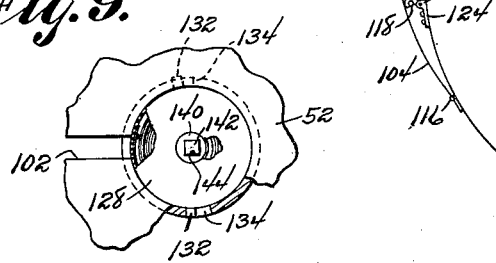
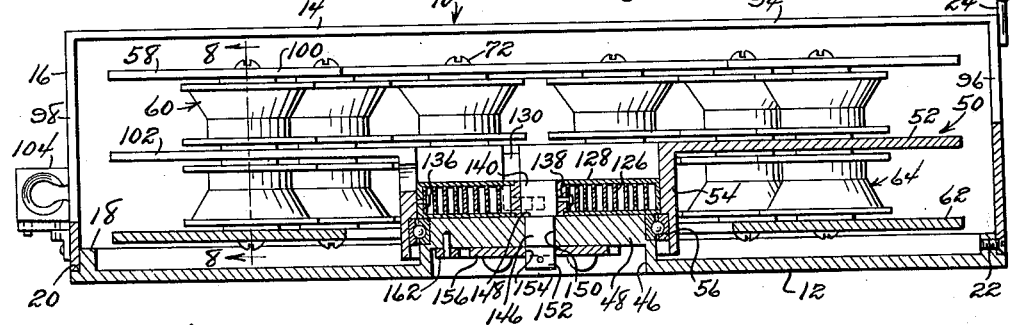
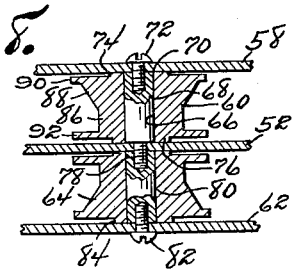
Jay T. Hellmann
INVENTOR
BY Victor J. Evans & Co.
ATTORNEYS Patented July 2, 1940

2,206,352

UNITED STATES PATENT OFFICE 2,206,352

CORD TAKE-UP

Jay T. Hellmann, Chicago, Ill.

Application January 20, 1939, Serial No. 252,038

7 Claims. (Cl. 242—107)

My invention relates to the disposition of cords such as are attached to electrical apparatus, and has among its objects and advantages the provision of an improved take-up device for such cords.

An object of my invention is to provide a take-up device of the type described in which a novel reel mechanism is employed for winding up the cord inside a housing in which novel means are employed for facilitating connection of the cord with the reel. The reel is of the multiple type in combination with two sets of freely rotating rollers arranged in drum-like fashion to provide a drum for each unit. The roller units are associated as a unit mounted on a suitable bearing to minimize resistance, while the roller units operate easily so that the cord may be payed out with relatively little effort. The operating mechanism is enclosed within a housing, which housing may serve as a support for a telephone and the like.

In the accompanying drawings:

Figure 1 is a perspective view of my invention illustrating a telephone of the cradle type mounted thereon;

Figure 2 is a top plan view of my invention;

Figure 3 is a plan view with the cover of the housing removed;

Figure 4 is a view similar to Figure 3 with the top guide plate of the reel unit removed;

Figure 5 is a view similar to Figure 4 illustrating the center plate of the reel unit removed together with other parts for the sake of clearness;

Figure 6 is a bottom plan view;

Figure 7 is an enlarged vertical sectional view;

Figure 8 is a sectional view along the line 8—8 of Figure 7;

Figure 9 is a fragmentary detail view illustrating the mounting for the spring; and Figure 10 is an enlarged sectional detail view of one of the openings through which the cord extends for connection with the reel mechanism.

In the embodiment selected to illustrate my invention, I make use of a housing 10 which includes a base plate 12 and a cover 14 provided with a circular flange 16 fashioned to embrace the right-angular flange 18 on the base plate 12. Flange 18 is spaced from the peripheral face of the base plate sufficiently far to provide a ledge 20 against which the lower end of the flange 16 is pressed. Flange 16 is fixedly related to the base plate through the medium of screws 22. To the flange 16 I connect rings 24 about which I loop straps 26, as at 28. One strap is provided with a buckle 30, while the other strap is perforated at 32 for connection with the buckle 30. Figure 1 illustrates the manner in which the telephone set 34 is positioned on the housing 10 and tied thereto through the medium of the straps 26.

The telephone set 34 includes the usual base 36, hand set or receiver 38 and a cradle structure 40. The telephone set is provided with the usual cord 42 for connection with the outside line, as well as a cord 44 for connection with the hand set 34.

Referring to Figure 7, base plate 12 is provided with a centrally located annular flange 46 provided with a wall 48 across its upper end. Flange 46 constitutes a support for the reel unit 50 which includes a gathering disc 52 provided with a centrally located annular flange 54 of such diameter as to fit loosely about the flange 46. Between the flanges 46 and 54 I interpose roller bearings 56 so as to facilitate rotation of the reel unit about the flange 46 as an axis. Between the carrier disc 52 and a guide plate or ring 58 I mount a series of spools 60 arranged concentrically about the axis of the flange 46 and closely spaced so as to provide a drum-like configuration upon which the cord 44 may be wound, as illustrated in Figure 4. Between the gathering disc 52 and a guide plate or ring 62 I mount a series of spool-like elements 64, which spool-like elements are arranged concentrically about the axis of the flange 46 in the same manner as the spool-like elements 60 to provide a drum-like configuration upon which the cord 44 is also wound, as illustrated in Fig. 5.

Figure 8 illustrates each of the spool-like elements 60 and 64. Since all the elements are identical in construction, the description of one will apply to all. According to Fig. 8, the spool-like element 60 is bored at 66 for loosely receiving a shaft 68 which constitutes a spacer between the gathering disc 52 and the guide plate 58. Shaft 68 has one end abutting the guide plate 58, as at 70, and is provided with a threaded bore for threaded connection with a screw 72 extending through an opening in the plate 58 and threaded into the shaft 68. The spool-like element 60 includes a small diameter extension 74 adjacent the guide plate 58 and a similar extension 76 adjacent the gathering disc 52.

The opposite end of the shaft 68 is provided with a threaded pin 78 which extends through an opening in the gathering disc 52 and is threaded into one end of the shaft 80 upon which the spool-like element 64 is rotatably mounted. Guide plate 62 is fixedly related to the lower end of the shaft 80 through the medium of a screw 82 which extends through an opening in the guide plate and is threaded into the shaft. Element 64 is provided with small diameter extensions 84 in the same manner as the element 60.

Fig. 8 illustrates the spool-like element 60 as being provided with a cylindrical part 86 and an inverted conically shaped part 88. The base of the part 88 terminates in a narrow flange 90, while the lower end of the cylindrical part 86 terminates in a relatively wide flange 92. Element 64 is identical in construction with the element 60 with the exception that it is reversed end for end so that both elements are located with the bases of the conically shaped parts 88 adjacent the plates 58 and 62.

Cover 10 is provided with a slot 94 across its entire top which slot extends downwardly of the peripheral flange 16, as at 96 and 98. Slot reach 96 has its lower end terminating substantially in the plane of the gathering disc 52, while the slot reach 98 has its lower end terminating substantially in the plane of the guide plate 62. Guide plate 58 is slotted at 100 so that the cord 44 may be positioned inside the mechanism by passing it downwardly through the slot 94, its reaches 96 and 98 and the slot 100 in the guide plate 58. The guide plate is slotted through on each side so that the cord 44 may be positioned between the spool-like elements 60, as illustrated in Fig. 4. Gathering disc 52 is provided with one slot 102 so that half the cord 44 inside the mechanism may be lowered into a position between the gathering disc in the guide plate 62 between two of the spool-like elements 64, as illustrated in Fig. 5. Thus the cord 44 may be convoluted upon the spool-like elements 60 in accordance with Fig. 4 and upon the spool-like elements 64 in accordance with Fig. 5.

Figs. 1 and 6 illustrate two projections 104 and 106 through which the cord 44 may move freely into and out of the housing 10. Fig. 10 illustrates the construction of the projection 106. The lower end of the reach 98 of the slot 94 terminates in a laterally extending slot 108, see Fig. 10, which slot is of such length as to permit the run of the cord 44 extending therethrough to take a tangential position with respect to the effective diameter defined by the spool-like elements 64. At the same time, the slot length permits the cord run to be bent gently so as to make for free and easy movement of the cord through the slot. The cord run extends through an eye 110, which eye is flared outwardly at each end, as at 112 so as to provide a configuration of gentle curvature to minimize resistance to movement of the cord. Eye 110 is slotted at 114 for the reception of the cord. After positioning of the cord in the eye, the extension 106 is swung against the side of the flange 16 about the axis of its hinge 116 which is anchored to the flange. Thus the flange 16 covers the slot 114.

Fig. 6 illustrates both extensions 104 and 106 as being hinged to the flange 16 in the same manner and each extension is provided with a pin 118 for connection with a hook 120 pivoted at 122 to a bracket 124 fixedly secured to the flange 16. Thus both extensions may be effectively latched to the flange, or pivoted therefrom by merely unhooking the hooks 120 from the pins 118. Both extensions are of the same construction and operate in the same manner. Figs. 1, 2 and 6 illustrate the extensions as being reversed.

Reel unit 50 is rotated against the tension of a coiled spring 126 when the receiver 38 is picked up and lifted off the cradle 40. The spring 126 is located inside a spring housing 128 fitting inside the flange 54. This flange is provided with two vertical slots 130 for the reception of lugs 132 projecting outwardly from the peripheral wall of the housing. Each slot 130 is provided with an offset slot 134 into which its respective lug 132 is positioned. One end of the spring 126 is fixedly secured at 136 to the inner face of the peripheral wall of the spring housing 128 and its opposite end is fixedly connected at 138 to a body 140 having a square opening 142 for the reception of the square end 144 of a shaft 146. Body 140 is therefore keyed against relative rotation with respect to the shaft 146 but is rotatably related to the spring housing 128. Fig. 7 illustrates the body 140 as being provided with bearing ends 148 which are rotatably positioned in openings in the top and bottom walls of the spring housing. The bottom wall of the housing lies upon the wall 48 and is supported thereagainst because of the lugs 132 and the slots 134.

Shaft 146 is rotatably journaled in a bore 150 in the wall 48. The shaft is squared at 152 for insertion in a square opening 154 in a ratchet or spring tensioning plate 156 positioned adjacent the lower face of the wall 48. The plate 156 is held in assembled relation with the square end 152 by means of a pin 158. Fig. 6 illustrates the plate 156 as being notched at 160 for engagement with a pawl 162 pivotally mounted at 164 upon the wall 48. A spring 166 is effective on the pawl for pressing the same into engagement with the notches 160.

It will thus be seen that the spring 128 is fixedly related at one end to the body 138 and that its opposite end is fixedly related to the flange 54 through the medium of the lugs 132 on the spring housing 128. The tension of the spring 126 is such as to rotate the reel unit 50 in the direction of the arrow 168, see Fig. 4. Such rotation winds up the cord 44 on the drums defined by the spool-like elements 60 and 64. Rotation of the reel unit 50 through the medium of the spring 126 draws the cord 44 inwardly of the housing 10 through both eye extensions 104 and 106. Lifting of the receiver 38 exerts a pull on the cord 44 for rotating the reel unit 50 in the opposite direction, which rotation is accomplished against the tension of the spring 126, so that when the receiver 38 is returned to the cradle 40, the spring 126 will rotate the reel unit for taking up the cord. Fig. 10 illustrates the cord 44 as being provided with an abutment 170 arranged to engage the end of the extension 106 to restrain further rotation of the reel unit 50 through the medium of the spring 126 when the cord has been taken up in the manner illustrated in Fig. 1.

The runs of the cord 44 extending through the extensions 104 and 106 are arranged tangentially of the reel unit 50, particularly the two drum units defined by the spool-like elements 60 and 64. The eye 110 associated with the extension 106 is located in a horizontal plane common to the cylindrical parts 86 of the spool-like elements 64, see Fig. 7. The eye in the extension 104 is aligned in the same manner with respect to the cylindrical parts 86 of the spools 60. The spring 126 is provided with such tension as to permit the cord 44 to be payed out easily when the receiver 38 is lifted. The spool-like elements 60 and 64 are rotatably mounted so as to rotate freely for compensating any variable convoluted condition of the cord 44 so as to eliminate frictional resistance. The conically shaped parts 88 associated with the spool-like elements 64 are so arranged as to crowd the convoluted cord in the direction of the flanges 92 so as to align the cord with the eye 110.

Similarly, the conically shaped parts 88 of the spool-like elements 60 crowd the convoluted cord associated with those units in the direction of the flanges 92 of those elements for aligning the cord with the eye in the extension 104. Thus the two drum units are so constructed as to constitute take-up means for the cord in addition to aligning the cord with their respective eyes 110. The diameter of the drums defined by the spool-like elements 60 and 64 are of such diameter as not to necessitate sharp bending of the cord 44. The runs of the cord extending through the eyelets 110 are bent gently and are tangentially arranged with respect to the diameters of their respective drums. Thus the cord will move easily through the eyes 110 in addition to operating in such a manner with respect to the reel unit 50 as to offer little resistance.

The tension of the spring 126 may be varied through rotation of the ratchet plate 156. To facilitate such rotation, I provide the ratchet plate with two ears 172 which constitute grips to facilitate rotation of the plate. Thus rotation of the plate 156 will wind or unwind the spring 126 depending upon the direction of rotation. Pawl 162 may be manually unlatched to permit rotation of the plate 156. The pawl is effectively urged into holding engagement with the notches 160.

The cord 44 is easily connected with the reel unit 50 by merely passing the cord first through the slot 94 and the runs 96 and 98. The cord is then passed through the slots 100 in the guide plate 58 after which half the length of the cord in the housing is lowered through the slot 102. Thus half the length of the cord will be arranged so as to wind upon the drum defined by the spool-like elements 60 and the other half will be arranged to be wound upon the spool-like elements 64 through rotation of the reel unit 50. The two half lengths of the cord are effectively separated for operating connection with their respective drums defined by the spool-like elements 60 and 64. The slot 94 is covered by the base of the telephone set, while the telephone set is effectively connected with the housing through the medium of the straps 26.

I claim:

1. In a cord take-up adapted to be positioned intermediate the ends of the cord: a support; a reel unit rotatably mounted on said support, said reel unit comprising first, second and third plates; a plurality of rotatably mounted spool-like elements positioned between said first and second plates and arranged to provide a first drum; a plurality of rotatably mounted spool-like elements positioned between said second and third plates and arranged to provide a second drum; said first plate being slotted for the reception of the intermediate portion of the cord for disposing said intermediate portion between predetermined spool-like elements in said first drum; said second plate being slotted to permit a run of said intermediate portion of the cord to be dropped between two spool-like elements of said second drum; and spring means operable on said reel unit for rotating the latter, to wind the cord on one side of said intermediate portion on said first drum and the cord on the other side of said intermediate portion on said second drum; said spring means yielding when a pull is exerted on said cord on either side of said intermediate portion to permit unwinding rotation of the reel unit.

2. In a cord take-up adapted to be positioned intermediate the ends of the cord: a support; a reel unit rotatably mounted on said support, said reel unit comprising first, second and third plates; a plurality of spool-like elements rotatably mounted on said first and second plates and arranged to provide a first drum; a plurality of spool-like elements rotatably mounted on said second and third plates and arranged to provide a second drum; said first plate being slotted for the reception of the intermediate portion of the cord for disposing said intermediate portion between diametrically opposed spools in said first drum; said second plate being slotted to permit a run of said intermediate portion of the cord to be dropped between two spool-like elements of said second drum; and spring means operable on said reel unit for rotating the latter, to wind the cord on one side of said intermediate portion on said first drum and the cord on the other side of said intermediate portion on said second drum; said spring means yielding when a pull is exerted on said cord on either side of said intermediate portion to permit unwinding rotation of the reel unit.

3. In a cord take-up adapted to be positioned intermediate the ends of the cord: a support; a reel unit rotatably mounted on said support, said reel unit comprising first, second and third plates; a plurality of rotatably mounted spool-like elements positioned between said first and second plates and arranged to provide a first drum; a plurality of rotatably mounted spool-like elements positioned between said second and third plates and arranged to provide a second drum; said first plate being slotted for the reception of the intermediate portion of the cord for disposing said intermediate portion between predetermined spool-like elements in said first drum; said second plate being slotted to permit a run of said intermediate portion of the cord to be dropped between two spool-like elements of said second drum; spring means operable on said reel unit for rotating the latter, to wind the cord on one side of said intermediate portion on said first drum and the cord on the other side of said intermediate portion on said second drum; said spring means yielding when a pull is exerted on said cord on either side of said intermediate portion to permit unwinding rotation of the reel unit; a housing enclosing said reel unit and having a cord receiving slot aligned with the slot in said first plate; and cord receiving eyelets carried by said housing for guiding the cord as it is unwound from and onto said drums.

4. In a cord take-up adapted to be positioned intermediate the ends of the cord: a support; a reel unit rotatably mounted on said support, said reel unit comprising first, second and third plates; a plurality of rotatably mounted spool-like elements positioned between said first and second plates and arranged to provide a first drum; a plurality of rotatably mounted spool-like elements positioned between said second and third plates and arranged to provide a second drum; said first plate being slotted for the reception of the intermediate portion of the cord for disposing said intermediate portion between predetermined spool-like elements in said first drum; said second plate being slotted to permit a run of said intermediate portion of the cord to be dropped between two spool-like elements of said second drum; spring means operable on said reel unit for rotating the latter, to wind the cord on one side of said intermediate portion on said first drum and the cord on the other side of said intermediate portion on said second drum; said spring means yielding when a pull is exerted on said cord on either side of said intermediate portion to permit unwinding rotation of the reel unit; a housing enclosing said reel unit and having a cord receiving slot aligned with the slot in said first plate; cord receiving eyelets carried by said housing for guiding the cord as it is unwound from and onto said drums; and a stop element on said cord arranged to engage one of said eyelets to restrain said spring means from turning the reel unit in the cord winding direction after a predetermined amount of cord has been taken up by the reel unit.

5. In a cord take-up adapted to be positioned intermediate the ends of the cord: a support; a reel unit rotatably mounted on said support, said reel unit comprising first, second and third plates; a plurality of rotatably mounted spool-like elements positioned between said first and second plates and arranged to provide a first drum; a plurality of rotatably mounted spool-like elements positioned between said second and third plates and arranged to provide a second drum; said first plate being slotted for the reception of the intermediate portion of the cord for disposing said intermediate portion between predetermined spool-like elements in said first drum; said second plate being slotted to permit a run of said intermediate portion of the cord to be dropped between two spool-like elements of said second drum; spring means operable on said reel unit for rotating the latter, to wind the cord on one side of said intermediate portion on said first drum and the cord on the other side of said intermediate portion on said second drum; said spring means yielding when a pull is exerted on said cord on either side of said intermediate portion to permit unwinding rotation of the reel unit; a housing enclosing said reel unit and having a cord receiving slot aligned with the slot in said first plate; cord receiving eyelets carried by said housing for guiding the cord as it is unwound from and onto said drums; the spool-like elements in each drum being fashioned to guide the cord moving through said eyelets into alignment therewith.

6. A telephone cord take-up, comprising: a housing adapted to serve as a mount for a telephone set; a reel unit rotatably mounted in the housing; said reel unit comprising a first plate, a second plate and a third plate; said second plate having a tubular member located centrally thereof; a bearing means between said tubular member and the bottom of said housing; spool-like elements positioned between said first and second plates to provide a drum; spool-like elements positioned between the second plate and said third plate to provide a second drum; means for rotatably mounting the spools on their respective plates and for connecting the plates as a unit; said housing and said first plate being provided with slots permitting said cord to be dropped to a position between diametrically opposed spool-like elements in said first-mentioned drum; said second plate being provided with a slot permitting a portion of the cord to be dropped into position between two spool-like elements in said second drum; and spring means operable on said reel unit for rotating the latter in a cord winding direction.

7. A telephone cord take-up, comprising: a housing adapted to serve as a mount for a telephone set; a reel unit rotatably mounted in the housing; said reel unit comprising a first plate, a second plate and a third plate; said second plate having a tubular member located centrally thereof; a bearing means between said tubular member and the bottom of said housing; spool-like elements positioned between said first and second plates to provide a drum; spool-like elements positioned between the second plate and said third plate to provide a second drum; means for rotatably mounting the spools on their respective plates and for connecting the plates as a unit; said housing and said first plate being provided with slots permitting said cord to be dropped to a position between diametrically opposed spool-like elements in said first-mentioned drum; said second plate being provided with a slot permitting a portion of the cord to be dropped into position between two spool-like elements in said second drum; spring means operable on said reel unit for rotating the latter in a cord winding direction; and eyelets mounted on said housing for guiding the cord wound upon and unwound from said drums.

JAY T. HELLMANN.